Nov. 5, 1935.  W. A. SUITER  2,019,875
APPARATUS FOR MAKING ICE CREAM SUCKERS
Filed June 11, 1932  3 Sheets-Sheet 1
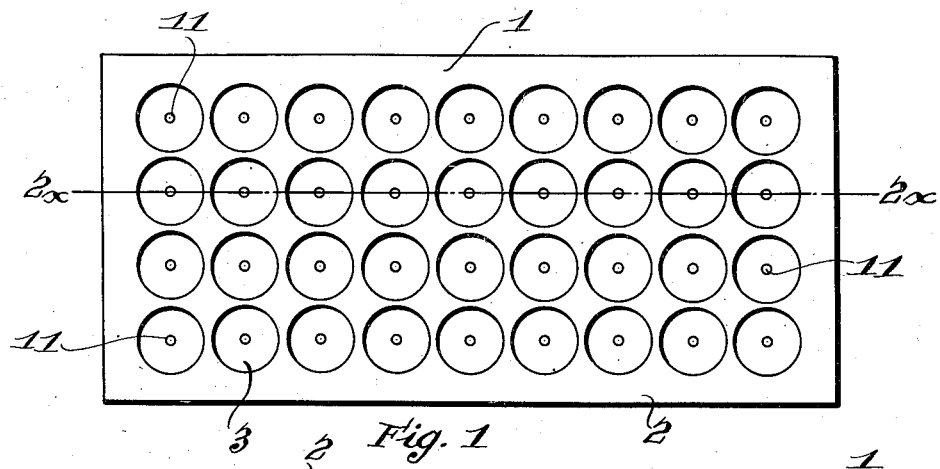
Fig. 1
Fig. 2
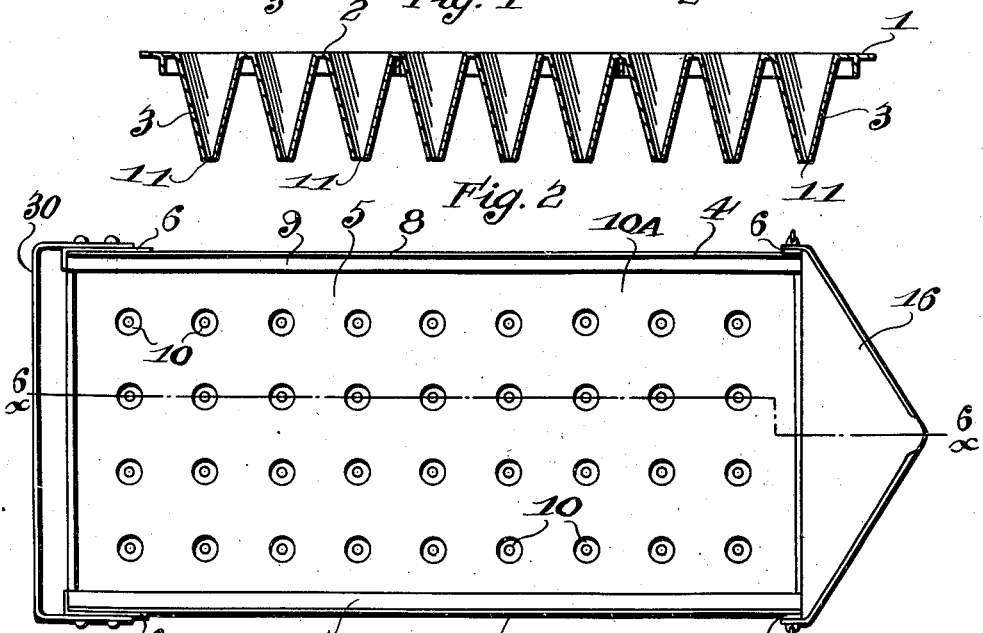
Fig. 3
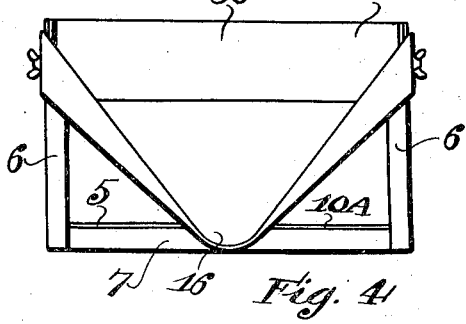
Fig. 4
Inventor
William A. Suiter
By Frank Kiefer
Attorney

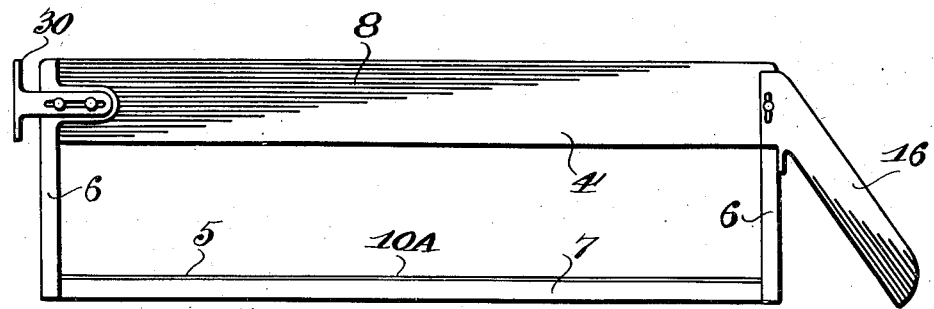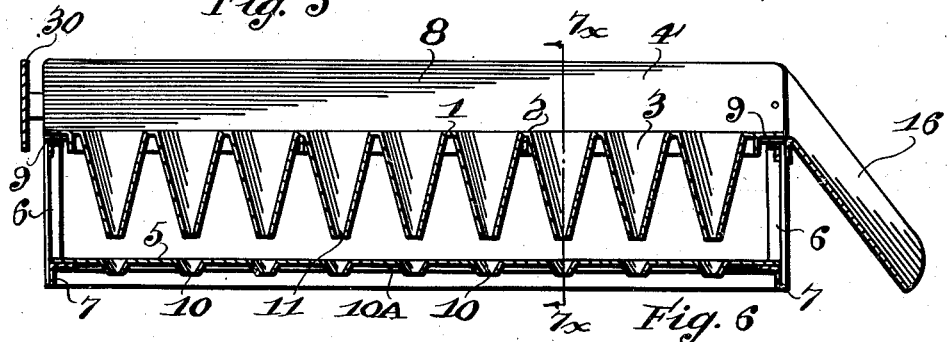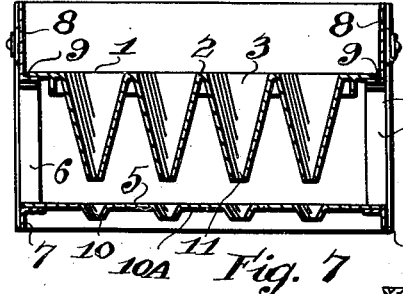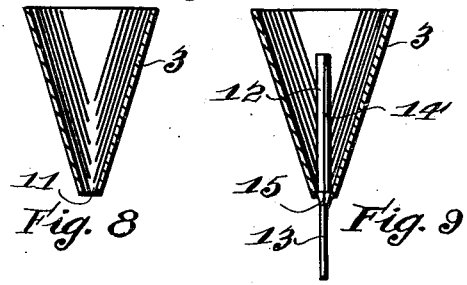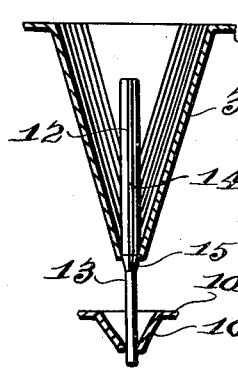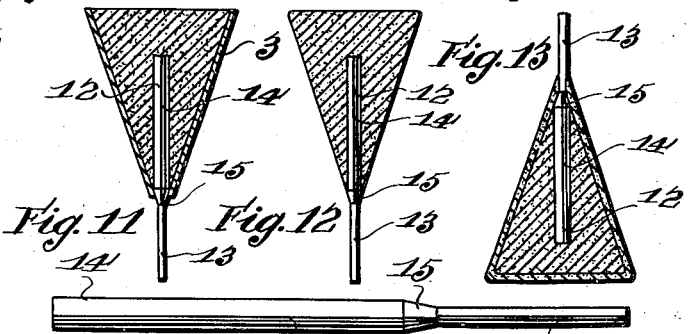

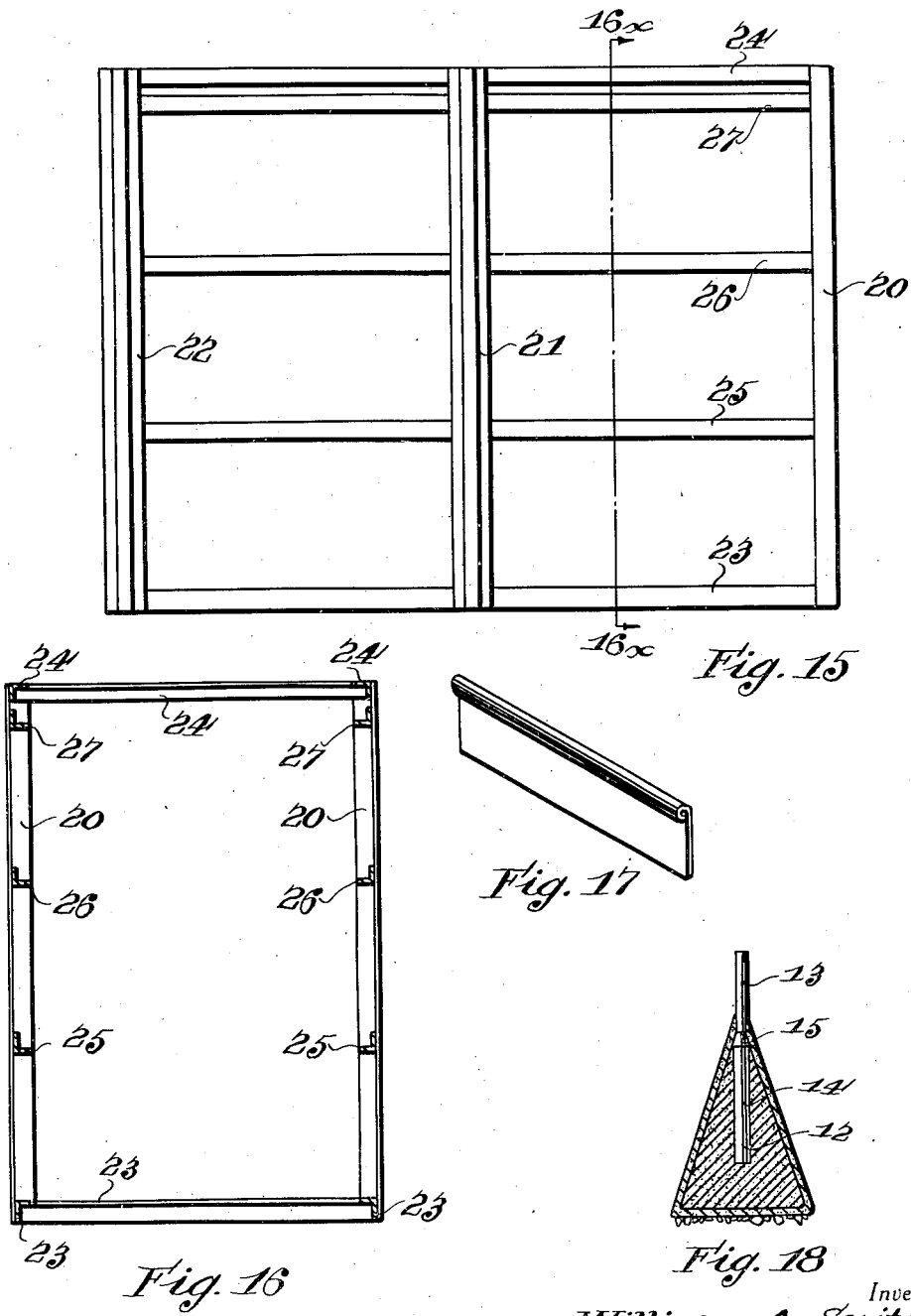

Patented Nov. 5, 1935

2,019,875

UNITED STATES PATENT OFFICE 2,019,875

APPARATUS FOR MAKING ICE CREAM SUCKERS

William A. Suiter, Rochester, N. Y., assignor, by direct and mesne assignments, of one-fourth to James Matheos, and one-fourth to Christ Matheos, both of Spencerport, N. Y.

Application June 11, 1932, Serial No. 616,672

6 Claims. (Cl. 107—19)

The object of this invention is to provide a process and apparatus for making cone-shaped ice cream suckers.

Another object of the invention is to simplify and cheapen the making of ice cream suckers of the kind in which the ice cream is coated with a stiff chocolate coating.

These and other objects of the invention will be illustrated in the drawings, described in the specification and pointed out in the claims at the end thereof.

In the drawings:

Figure 1 is a top plan view of a tray of molds in which the ice cream cones are poured.

Figure 2 is a vertical longitudinal section on the line $2x$—$2x$ of Figure 1.

Figure 3 is a top plan view of the filling rack.

Figure 4 is an end elevation of the filling rack viewed from the right in Figure 3.

Figure 5 is a side elevation of the filling rack shown in Figure 3.

Figure 6 is a vertical longitudinal section through the filling rack, the section being taken on the line $6x$—$6x$ of Figure 3, a tray of molds being shown in longitudinal section in place in the filling rack.

Figure 7 is a vertical transverse section on the line $7x$—$7x$ of Figure 6.

Figure 8 is a vertical section through one of the cones.

Figure 9 is a vertical section through one of the cones, showing in place therein one of the wooden sticks on which the sucker is mounted.

Figure 10 is a vertical section through one of the cone-shaped molds and through the centering pan, showing a wooden stick in place therein.

Figure 11 is a vertical section through one of the cones with the wooden stick placed therein, the cone being shown filled with ice cream.

Figure 12 is a vertical section of an ice cream cone mounted on a wooden stick after the cream has been frozen and removed from the cone-shaped mold.

Figure 13 is a vertical section through the ice cream cone showing it after a chocolate coating has been applied thereto.

Figure 14 is a detail view, full size, of one of the wooden sticks on which the sucker is mounted.

Figure 15 is a side elevation of the freezing rack.

Figure 16 is a vertical transverse section through the freezing rack, the section being taken on the line $16x$—$16x$ of Figure 15.

Figure 17 is a detail view of the scraper that is used in moving the ice cream along the filling tray.

Figure 18 is a detail view of the ice cream cone after it has been coated with nuts, etc.

In the drawings like reference numerals indicate like parts.

In the drawings in Figure 1 is shown a tray of molds which is indicated by the reference numeral 1. This tray consists of a plate 2 perforated with suitable round holes, in which are fastened the individual cone-shaped molds 3, the cone-shaped molds being welded in place in the plate 2. After the assembling of the plate and molds has been completed, it is tinned or otherwise suitably coated for sanitary effect.

A filling rack 4 is provided, which is adapted to hold the tray of molds shown in Figures 1 and 2. This filling rack comprises a centering pan 5, to which is joined the uprights 6, 6 and the angles 7, 7 running horizontally lengthwise and crosswise of the structure at the bottom. At the top of the rack are provided the guides or plates 8, 8 having the flanges 9, 9 on the bottom thereof. On these flanges is adapted to rest the edges of the tray 2, in which position the lower end of each of the cone-shaped molds is directly over one of the cone-shaped pockets 10 in the centering pan 5. Each of the cone-shaped molds has an opening 11 in the bottom thereof, and this opening is directly in line with a similar opening in the bottom of the cone-shaped pocket or centering cup 10. The object of the centering cup is to hold the stick 12 in an upright position in the mold. These cups are formed in the plate 10—A which is mounted in the bottom of the filling rack.

Before the tray is set in the filling rack, the wooden sticks 12 are placed one in each cone-shaped mold, as shown in Figure 10. Each of these sticks has one cylindrical end 13 of small diameter and another cylindrical end 14 of large diameter, the two ends being connected by a cone-shaped section 15.

This stick serves several purposes, as follows. The cone-shaped section 15 acts as a cork to close the opening in the end of the mold. The small end 13 acts as a handle, and the large end 14 acts as a support for the ice cream cone, which is frozen around it and to it.

With the tray in place on the filling rack, as shown in Figures 3 and 6, the ice cream is poured on the tray. The ice cream has been partly frozen, so as to reduce it to a plastic or mushy condition, in which condition it will readily settle or flow into the molds. The ice cream is then brushed forward and back over the molds with a scraper, which causes the ice cream to fill all the molds evenly to the top thereof, and the surplus of the ice cream is then scraped into the inclined trough 16 on the end of the filling rack, from which it flows down into a can or any other suitable receptacle. The surplus ice cream can be poured onto the next tray that is placed in the filling rack, and the operation is repeated for the purpose of filling the cone-shaped molds of each tray in turn.

A guard plate 30 is provided, as shown at the left of Figure 5. This plate is adjustable in and out and prevents the cream from running off at that end of the tray. The guard plate is adjustable in and out and when in position shown in Figure 5 it permits removal of the tray. When moved to the right it prevents waste of cream. The guard plate has a slotted arm on each end of it, which arms are at right angles to the plate and parallel to each other. The slots on these arms engage with studs on the sides of the filling rack and by them are guided and limited in their motion.

Each of the cone-shaped molds is large enough to hold about four ounces of the frozen or plastic cream by volume, and the trays are preferably made so that each tray carries 36 molds, arranged in rows of nine running lengthwise, and arranged in rows of four running crosswise of the trays.

As fast as the trays are filled with ice cream, they are placed on the freezing rack, each of which racks is adapted to hold three trays. The freezing racks are shown in Figure 15 and each rack comprises the uprights 20, 21 and 22, and the bottom angles 23 and top angles 24 which extend around the four sides of the rack and hold the uprights together. Fastened to the uprights are the angles 25, 26 and 27, which are arranged in pairs and are adapted to receive and hold the trays. This freezing rack with the filled trays thereon is then placed in the freezing room, where it remains until the ice cream cones are completely frozen and are ready to be removed from the molds.

The cones are removed from the molds by turning the tray upside down and pushing the cones out with the sticks or handles 13. Using the handle 13, they are then dipped into a pot of coating material which consists preferably of milk chocolate and cocoa butter, which promptly cools and hardens on and around the ice cream and forms an enclosing shell therefor. These are then stored in a cold place until it is desired to sell or eat them.

The flat end of the cone can then be dipped into a pan of nut meats, preferably ground, or sugar, or candy, etc., which will adhere thereto and add to the attractiveness of the cone as an edible article.

This application is a continuation in part of application Serial Number 607,806, filed April 27, 1932.

I claim:

1. In an apparatus for molding ice cream suckers, the combination of a plurality of cone-shaped receptacles, each having the large end at the top and open, and each having the small end at the bottom with a small opening at the bottom thereof, surrounded by a cone-shaped wall adapted to hold a stick having a large cylindrical section at one end and a small cylindrical section at the other end connected by a short cone-shaped section, said stick being placed in each of said receptacles from above with the large end up and the cone-shaped section in said opening to close said opening from above, said receptacle being adapted to receive ice cream in a plastic condition, and hold it therein while it is being frozen around the upper end of the stick, said frozen ice cream and stick being adapted to be removed from the receptacle for further treatment.

2. In an apparatus for molding ice cream suckers, the combination of a plurality of cone-shaped receptacles, each having the large end at the top and open, and each having the small end at the bottom with a small opening at the bottom thereof surrounded by a cone-shaped wall adapted to hold a stick having a large cylindrical section at one end and a small cylindrical section at the other end connected by a short cone-shaped section, one of said sticks being placed in each of said receptacles from above with the large end up and the cone-shaped section in said opening to close said opening from above, a rack for supporting said cone-shaped receptacles in position to receive the ice cream fed therein, said receptacles being adapted to receive ice cream in a plastic condition and hold it therein while it is being frozen around the upper end of the stick, said receptacle permitting the removal of the frozen cone of ice cream and the stick.

3. In an apparatus for molding ice cream suckers, the combination of a plurality of cone-shaped receptacles having a small opening in the bottom thereof surrounded by a cone-shaped wall adapted to hold a stick having a large cylindrical section at one end and a small cylindrical section at the other end connected by a short cone-shaped section, said stick being placed in said receptacle from above with the large end up and the cone-shaped portion in said opening to close said opening from above, a centering pan placed below said cone-shaped receptacle, said pan having a series of cup-shaped recesses therein adapted to engage the lower end of said sticks and hold them in an upright position.

4. In an apparatus for molding ice cream suckers, the combination of a plate having a plurality of round holes therein, cone-shaped molds attached to the under side of said plate with the large end up and open, each mold being concentric with one of the holes in said plate, each of said molds having a small opening in the bottom thereof surrounded by a cone-shaped wall adapted to hold a stick having a large cylindrical section at one end and a small cylindrical section at the other end connected by a short cone-shaped section, one of said sticks being placed in each of said molds from above with the large end up and with the cone-shaped section in the small opening to close said opening from above, said plate being adapted to receive plastic ice cream thereon from which it runs into the molds to fill the molds, said molds being adapted to hold the ice cream therein while it is being frozen around the upper ends of the sticks, said molds permitting the removal of the frozen cones of ice cream and the sticks through the upper ends of the molds.

5. An apparatus for molding ice cream suckers comprising a filling rack having inwardly extending flanges thereon near the top thereof, a plate in the bottom thereof having centering cups formed therein, a tray having a plurality of round holes therein with a cone-shaped mold fastened immediately under each of said holes, each mold having the large end open at the top and having the small end at the bottom with a small opening in the bottom of the mold surrounded by a cone-shaped wall adapted to hold a stick having a large cylindrical section at one end and a small cylindrical section at the other end connected by a short cone-shaped section, said stick being placed in each of said receptacles from above with the large end up and the cone-shaped section in said opening to close said opening from above and the small end in a centering cup, said tray being supported on said flanges and being adapted to receive partially frozen ice cream thereon for the purpose of filling said molds, said tray being capable of being removed from the filling rack and placed in a cold chamber for the purpose of freezing the ice cream in the molds.

6. In an apparatus for molding ice cream suckers, the combination of a plurality of cone-shaped receptacles having a small opening in the bottom thereof surrounded by a cone-shaped wall adapted to hold a stick having a large cylindrical section at one end and a small cylindrical section at the other end connected by a short cone-shaped section, said stick being placed in said receptacle from above with the large end up and the cone-shaped portion in said opening to close said opening from above, means for holding said stick in an upright position in said cone-shaped receptacle.

WILLIAM A. SUITER.